Figure 1:
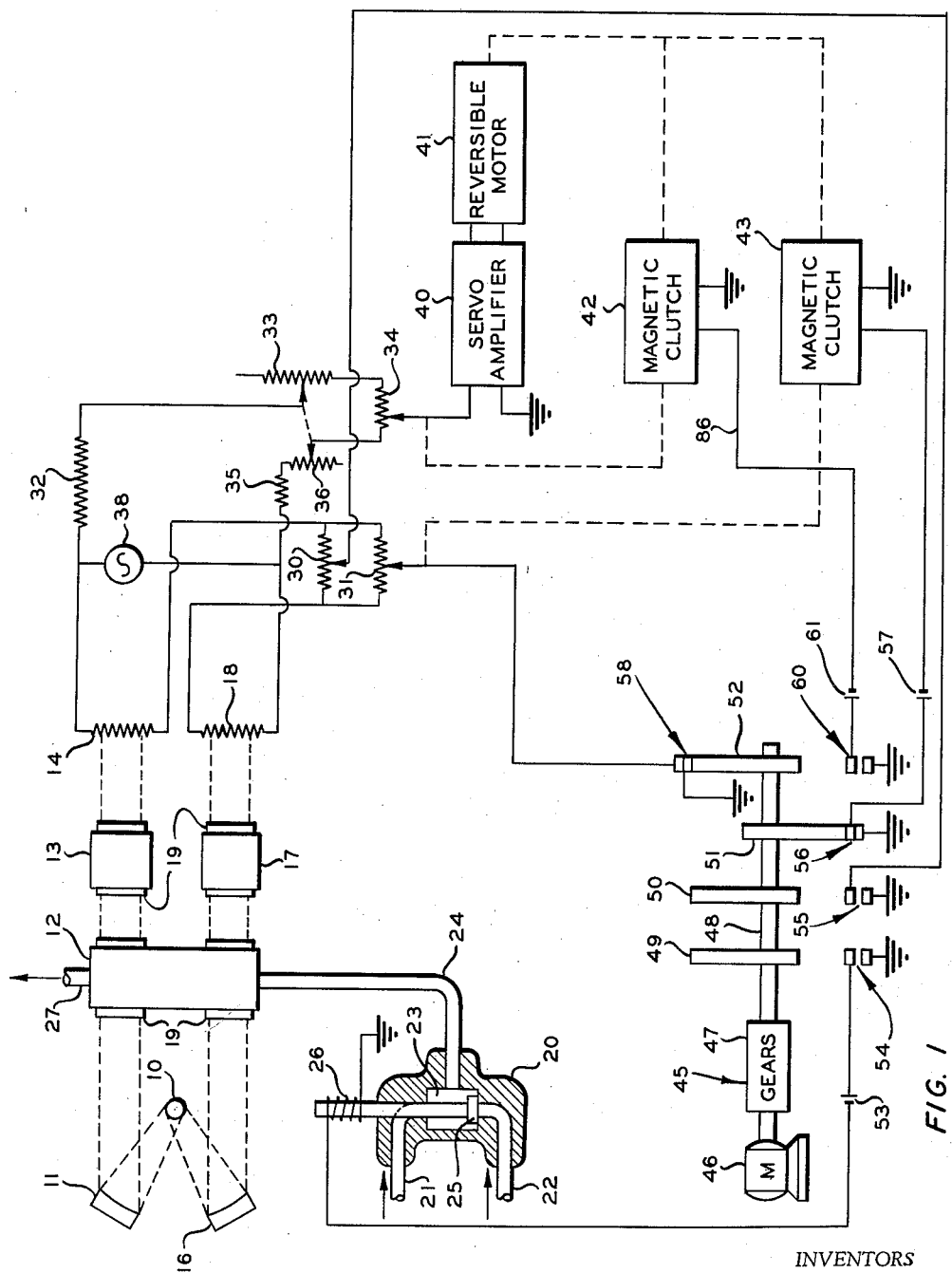

Dec. 12, 1961 H. L. FISHER ET AL 3,013,153
ANALYZER AND DRIVE MECHANISM
Filed March 14, 1957 3 Sheets-Sheet 1

INVENTORS
H.L. FISHER
G.T. PORTER
G.E. PRICE
BY Hudson & Young
ATTORNEYS

Dec. 12, 1961  H. L. FISHER ET AL  3,013,153
ANALYZER AND DRIVE MECHANISM
Filed March 14, 1957  3 Sheets-Sheet 2

INVENTORS
H.L. FISHER
G.T. PORTER
G.E. PRICE
BY
Hudson & Young
ATTORNEYS

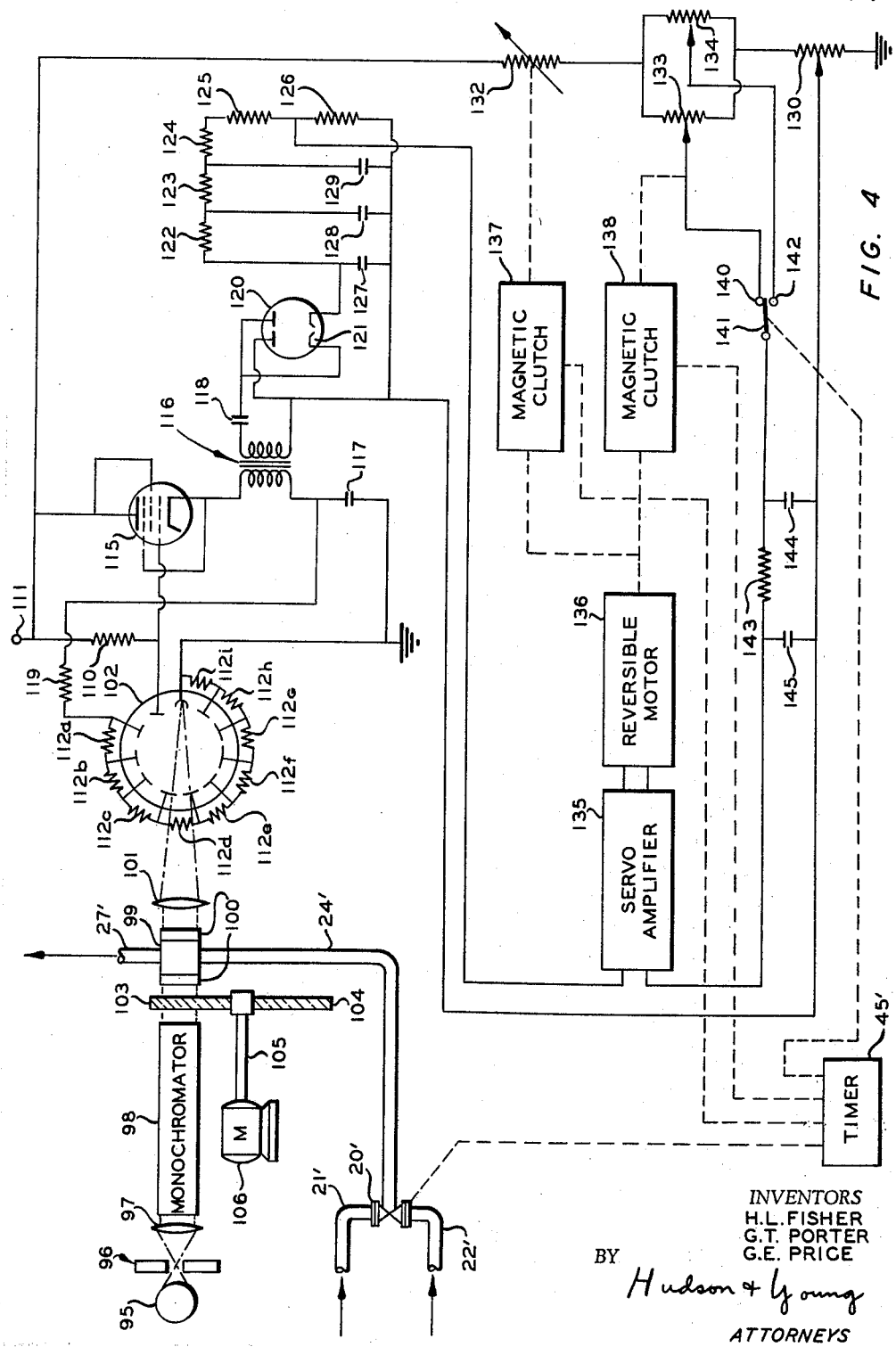

United States Patent Office 3,013,153
Patented Dec. 12, 1961

1

3,013,153
ANALYZER AND DRIVE MECHANISM
Horace L. Fisher, Bartlesville, and Grady T. Porter, Dewey, Okla., and Glen E. Price, Caney, Kans., assignors to Phillips Petroleum Company, a corporation of Delaware
Filed Mar. 14, 1957, Ser. No. 645,962
3 Claims. (Cl. 250—43.5)

This invention relates to improved fluid stream analyzers which are adapted to be calibrated periodically. In another aspect, it relates to an improved drive mechanism.

Various types of instruments have recently been developed for the analysis of fluid streams. In many of these instruments, a fluid stream to be analyzed is directed to the analyzer, and the output signal thereof is represented by a balance motor rotation. Periodically, a reference fluid of known composition is directed to the analyzer in place of the test fluid. During this standardization period, the analyzer provides a signal which is employed to adjust an element which controls the calibration of the analyzer so as to compensate for any variations due to temperature changes or other factors which influence the operation of the analyzer. Heretofore, two balance motors have generally been required in such an analyzer. One balance motor provides the output signal during normal operation, and the second motor is employed during the calibration step. In many of these analyzers it is desirable to reduce the size of the instrument as much as possible. It is also desirable to reduce the number of analyzer components.

In accordance with the present invention, there is provided an improved analyzer of this general type, but which requires only a single balance motor. The output signal from the measuring means is applied at all times to the single balance motor. The drive shaft of the motor is connected selectively through one of two clutch mechanisms to provide both an output signal and a calibration signal. The clutch mechanisms are actuated by a timer to provide the desired switching.

There is also provided in accordance with this invention an improved drive mechanism. The driving member is connected to the driven member by means of an assembly which prevents slippage if the load on the driven member exceeds a predetermined value. The driving member and the driven member are mounted for rotation adjacent one another. Both members are provided with openings into which a ball is inserted. The ball is retained in the openings by means of a spring so that motion is transmitted through the ball during normal operation. If the load on the driven member exceeds a predetermined amount, the spring permits the ball to move out of one of the openings so that there is no longer a driving connection between the two members.

Accordingly, it is an object of this invention to provide simplified calibration apparatus for analytical instruments which utilizes the balance motor of the instrument.

Another object is to provide a novel clutch system to permit a single prime mover to actuate selectively a plurality of driven members.

A further object is to provide a simplified drive mechanism which permits release of the driving mechanism if a load greater than a predetermined amount is applied to the system.

Other objects, advantages and features of the invention should become apparent from the following detailed description which is taken in conjunction with the accompanying drawing in which:

FIGURE 1 is a schematic representation of an infrared analyzer having the calibration mechanism of the present invention incorporated therein.

2

Figure 3:
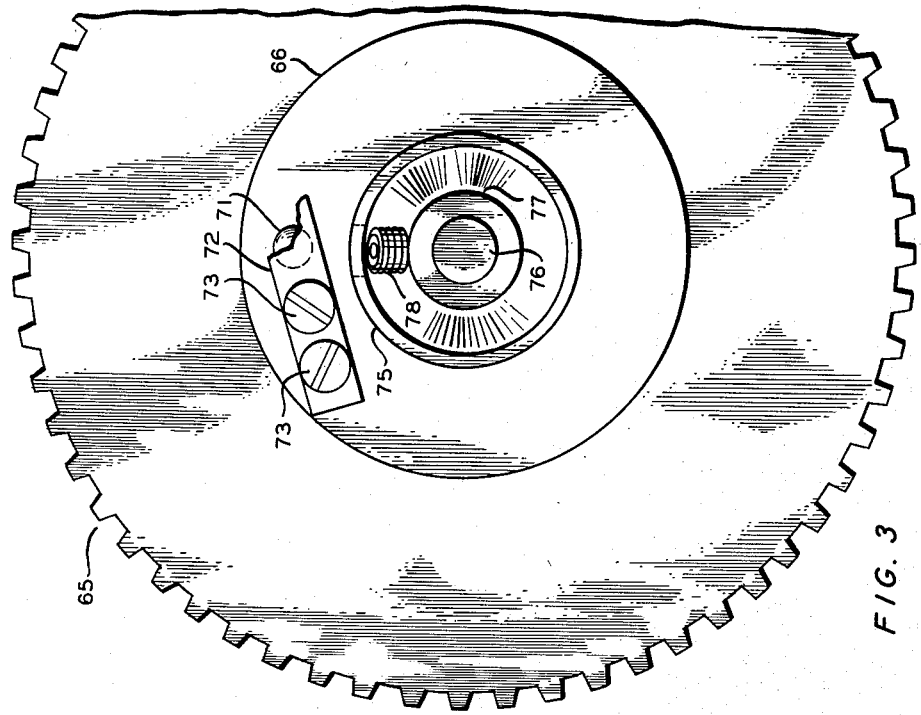
Figure 2:
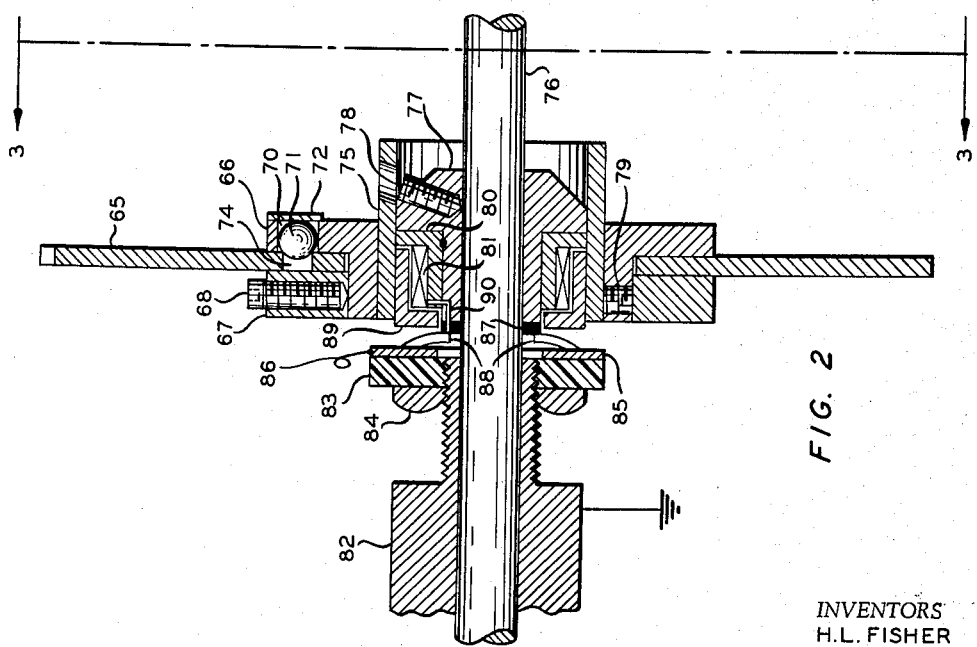

FIGURE 2 is a view, shown partially in section, of the clutch mechanism of this invention.
FIGURE 3 is an elevational view taken along the line 3—3 in FIGURE 2.
FIGURE 4 is a schematic representation of an ultraviolet analyzer having the calibration mechanism of the present invention incorporated therein.

Referring now to the drawing in detail and to FIGURE 1 in particular, there is shown a source 10 of infrared radiation. A first beam of radiation from source 10 is directed by a reflector 11 through a sample cell 12 and a filter cell 13 to impinge upon a first temperature sensitive resistance element 14. A second beam of radiation from source 10 is directed by a reflector 16 through sample cell 12 and a filter cell 17 to impinge upon a second temperature sensitive resistance element 18. Cells, 12, 13, and 17 are provided with windows 19 which are transparent to the radiation employed. A fluid to be analyzed is introduced into a valve 20 through a conduit 21. A reference fluid of predetermined composition is introduced into valve 20 through a conduit 22. Conduits 21 and 22 communicate with a chamber 23 in valve 20. Chamber 23 is connected by a conduit 24 to the inlet of sample cell 12. A plunger 25 normally blocks the passage between conduits 22 and 24 so that conduit 21 is in communication with conduit 24. Plunger 25 is adapted to be moved by a solenoid 26 so that conduits 22 and 24 are in communication when the solenoid is energized. Fluid is removed from cell 12 through an outlet conduit 27.

Resistance elements 14 and 18 are connected in an electrical bridge network. Potentiometers 30 and 31 are connected in parallel relationship with one another between resistance elements 14 and 18. The second terminal of resistance element 14 is connected through a resistor 32 and a variable resistor 33 to the first end terminal of a potentiometer 34. The second end terminal of resistance element 18 is connected through a resistor 35 and a variable resistor 36 to the second end terminal of potentiometer 34. Variable resistors 33 and 36 are mechanically connected to one another so that an increase in one resistor results in a corresponding decrease in the other. The first terminal of an alternating current source 38 is connected between resistors 14 and 32. The second terminal of current source 38 is connected between resistors 18 and 35. The contactor of potentiometer 34 is connected to the first input terminal of a servo amplifier 40. The second input terminal of amplifier 40 is connected to ground. The output terminals of amplifier 40 are connected to a reversible motor 41. This servo system operates so that the direction of rotation of motor 41 is representative of the phase of the input signal to amplifier 40. The drive shaft of motor 41 is connected through a first magnetic clutch 42 to the contactor of potentiometer 34 and through a second magnetic clutch 43 to the contactor of a potentiometer 31.

Valve 20 and clutches 42 and 43 are controlled by means of a timer 45 which is operated by a constant speed motor 46. The drive shaft of motor 46 is connected through a gear train 47 to a shaft 48 which carries cams 49, 50, 51, and 52. Cam 49 is adapted to close a first set of contacts 54. Closure of contacts 54 results in a current source 53 being connected in circuit with solenoid 26 to operate valve 20. Cam 50 is adapted to close a second set of contacts 55. Closure of contacts 55 results in the contactor of potentiometer 30 being connected to ground. Cam 51 is adapted to close a third set of contacts 56. Closure of contacts 56 results in a current source 57 being connected in circuit with magnetic clutch 43 to actuate the clutch so that the drive shaft of motor 41 is connected to the contactor of potentiometer 31. Cam 52 is adapted to close a fourth set of contacts 58. Closure of contacts 58 results in the contactor of potentiometer 31 being connected to ground. Cam 52 is also adapted to close a fifth set of contacts 60. Closure of contacts 60 results in a current source 61 being connected in circuit with magnetic clutch 42 to energize the clutch so that the drive shaft of motor 41 is connected to the contactor of potentiometer 34.

Filter cell 13 normally is filled with a material which absorbs radiation wave lengths corresponding to the wave lengths of radiation absorbed by a constituent to be measured in the test sample. Filter cell 17 normally is filled with air or other non-absorbing gas, and is provided merely to equalize the optical paths. The analyzer is calibrated initially by passing a fluid of known composition through sample cell 12 from conduit 21. Potentiometer 34 is set to a predetermined point on its scale, such as the mid-point. Potentiometer 31 is set to a position corresponding to the known percentage of the test component in the sample cell by operation of motor 41 through clutch 43. This particular condition of balance is obtained by adjusting resistors 33 and 36 until the motor is at rest at the desired point. Valve 20 is then actuated so that the reference fluid from conduit 22 is circulated through sample cell 12. Potentiometer 30 is adjusted manually until motor 41 drives the contactor of potentiometer 34 to the position at which it was originally set. Clutch 42 is actuated at this time. The analyzer is then in condition for operation.

During the normal analysis period, timer 45 occupies the illustrated position. This results in the test fluid circulating through sample cell 12 from conduit 21. Motor 41 is connected through clutch 43 to the contactor of potentiometer 31. If the percentage of the component of interest is different in the sample stream than in the original calibration sample, the impedances of elements 14 and 18 are changed due to the different mounts of radiation impinging thereon. This results in an unbalanced signal being produced in the bridge network which energizes motor 41. Motor 41 adjusts the position of the contactor of potentiometer 31 until a balanced condition is again restored. The amount of rotation necessary to restore this balance is representative of the percentage of the component of interest in the sample stream. This rotation can be indicated by a dial attached to the contactor of potentiometer 31 or by a telemetering potentiometer, not shown, which is connected thereto.

At the end of a predetermined period, motor 46 drives shaft 48 so that contacts 54, 55, and 60 are closed and contacts 56 and 58 are opened. This results in solenoid 26 being energized so that a reference fluid is directed through cell 12. Clutch 42 is energized and clutch 43 is deenergized. If the calibration of the analyzer has changed, motor 41 adjusts the contactor of potentiometer 34 until the bridge circuit is again balanced. Further rotation of shaft 48 restores the timer to the initial condition wherein the test fluid is again circulated through cell 12. The calibration normally occupies a relatively short portion of the cycle.

The clutch mechanism of this invention is illustrated in FIGURES 2 and 3. The drive shaft of motor 41 is connected by a gear train, not shown, to a spur gear 65. Gear 65 is mounted between a bushing 66 and a retainer ring 67 which is attached to bushing 66 by means of set screws 68. Gear 65 is free to slide between bushing 66 and ring 67. Bushing 66 is provided with an opening 70 into which is positioned a steel ball 71. Ball 71 is retained in this position by means of a spring plate 72 which is attached to bushing 66 by screws 73. Gear 65 is provided with an opening 74 which is of smaller diameter than ball 71. Ball 71 normally is partially inserted within opening 74 so that rotation of gear 65 results in a corresponding rotation of bushing 66.

Bushing 66 is secured to a sleeve 75 which surrounds a shaft 76 by means of a set screw 79. A bushing 77 is secured to shaft 76 by a set screw 78. Bushing 77 supports a bushing 80 which in turn supports a solenoid 81. Sleeve 75 carries a bushing 89 which normally is spaced from bushing 80.

Shaft 76 is positioned for rotation within a stationary bearing sleeve 82. A disk 83 of electrically insulating material is threaded to the end of sleeve 82 and retained in position by a lock nut 84. A ring of electrically conductive material 85 is attached to the face of disk 83. An electrical lead 86 is connected to ring 85. A ring 87 of electrically insulating material is secured to bushing 77. A plurality of springs 88 are attached to ring 87 and extend therefrom into engagement with ring 85. These springs are connected by an electrical lead 90 to one terminal of solenoid 81. The second terminal of solenoid 81 is grounded through shaft 76. Springs 88 are free to slide on ring 85 to make continuous electrical contact therewith. Electrical energy is supplied to solenoid 81 through lead 86, ring 85, spring 88, and lead 90. The passage of current through solenoid 81 results in a magnetic circuit being established which forces bushing 89 into engagement with bushing 80. This results in shaft 76 being connected to bushing 66 so that rotation of gear 65 results in a corresponding rotation of shaft 76. Shaft 76 is mechanically connected to the contactor of one of the potentiometers 31 or 34.

In order to prevent damage to the potentiometer in the event motor 41 tends to drive the potentiometer beyond is end stops, a release mechanism is incorporated in the clutch assembly. This is provided by ball 71 and spring 72. If the load on shaft 76 exceeds a predetermined amount, ball 71 is forced out of opening 74 against spring 72. Ball 71 then rotates on gear 65 and the rotation of bushing 66 is terminated. Spring plate 72 is sufficiently flexible to permit this movement.

In FIGURE 4, there is shown an ultraviolet analyzer which has the improved calibration system of this invention incorporated therein. Radiation in the ultraviolet spectrum is provided by a source 95 which can be a hydrogen discharge lamp. A portion of the radiation emitted by source 95 is transmitted through a slit 96. This transmitted radiation is collimated by a lens 97 and directed through a monochromater 98 and a sample cell 99. The transmitted radiation is focused by a lens 101 on the cathode of a photomultiplier tube 102.

A chopper assembly is positioned for rotation in the radiation beam. This chopper comprises a pair of semicircular disks 103 and 104 which are mounted on the drive shaft 105 of a motor 106. Disk 103 is formed of a material which is transparent to the radiation of interest and disk 104 is formed of a material which has radiation absorption properties approximating those of the material to be detected. If the analyzer is employed to detect butadiene, for example, disk 103 can be formed of quartz and disk 104 can be formed of Vycor. Vycor is a glass manufactured by Corning Glass Works, Corning, New York, and contains approximately 98 percent silicon dioxide. The ultraviolet transmission properties of Vycor are similar to those of butadiene. The rotation of disks 103 and 104 thus results in the transmission of a beam of radiation that has an amplitude that varies in substantially the form of a rectangular wave.

This fluctuating radiation beam is directed through a sample cell 99. The half cycles of the transmitted beam which pass through the Vycor section 104 do not change in intensity when transmitted through cell 99. However, the half cycles of radiation which pass through the quartz section 103 are diminished in intensity in accordance with the amount of butadiene in sample cell 99. The difference in intensity between the two half cycles thus provides the indication of the amount of butadiene present in the same cell. This difference is measured by the detecting circuit which is connected to photomultiplier tube 102.

The cathode of tube 102 is connected to ground. The anode of tube 102 is connected through a resistor 110 to a terminal 111 which is maintained at a positive potential. A voltage dividing network comprising resistors 112a, 112b, . . . 112i is connected between the dynode adjacent the anode of tube 102 and ground. The dynodes of tube 102 are connected to junctions between these resistors, as illustrated. The anode of tube 102 is connected to the control grid of a pentode 115. The anode and screen grid of pentode 115 are connected to terminal 111. The cathode and suppressor grid of pentode 115 are connected to ground through the primary winding of a transformer 116 and a capacitor 117. The dynode of tube 102 adjacent the anode is connected through a resistor 119 to the junction between capacitor 117 and the primary winding of transformer 116.

The first terminal of the secondary winding of transformer 116 is connected through a capacitor 118 to the anode of a diode 120. The second terminal of the secondary winding of transformer 116 is connected to the anode of a diode 121. The cathode of diode 120 is connected to the contactor of potentiometer 130 through series connected resistors 122, 123, 124, 125, and 126. A capacitor 127 is connected between the cathode of diode 120 and the contactor of potentiometer 130. Capacitors 128 and 129 are connected between the contactor of potentiometer 130 and the end terminals of resistor 123, respectively.

A voltage dividing network is connected between terminal 111 and ground. This network comprises a variable resistor 132, a potentiometer 133 and potentiometer 130 which are connected in series relationship. A potentiometer 134 is connected in parallel with potentiometer 133. The contactors of potentiometers 133 and 134 are connected to terminals 140 and 142, respectively, which are adapted to be engaged by a switch 141. Switch 141 is connected through a resistor 143 to the first input terminal of a servo amplifier 135. The second input terminal of amplifier 135 is connected to the junctions between resistors 125 and 126. Capacitors 144 and 145 are connected between the contactor of potentiometer 130 and the end terminals of resistor 143, respectively. The output terminals of amplifier 135 are connected to a reversible motor 136. The drive shaft of motor 136 is connected through a magnetic clutch 137 to adjustable resistor 132 and through a magnetic clutch 138 to the contactor of potentiometer 133.

A sample fluid and a reference fluid are directed to a valve 20' through respective conduits 21' and 22'. Valve 20' is connected to sample cell 99 through a conduit 24'. Valve 20', clutches 137 and 138 and switch 141 are actuated by a timer 45' which can be of the form shown in FIGURE 1.

Potentiometer 133 corresponds generally to potentiometer 31 of FIGURE 1 and resistor 132 corresponds generally to potentiometer 34 of FIGURE 1. In normal operation of the analyzer of FIGURE 4, motor 136 adjusts the contactor of potentiometer 133 to maintain a balanced condition. The output signal of photomultiplier tube 102 is rectified by the voltage doubling circuit associated with diodes 120 and 121. A portion of this rectified voltage is compared by amplifier 135 with a reference voltage at the contactor of potentiometer 133.

During the standardization cycle, clutch 137 is energized and switch 141 is moved to contact terminal 142. Motor 136 then adjusts resistor 132 until the potential at the contactor of potentiometer 134 is equal to the potential at the junction between resistors 125 and 126. Potentiometer 130 permits an initial adjustment to be made in a manner corresponding to the action of variable resistors 33 and 36 of FIGURE 1. The clutch mechanism employed in the apparatus of FIGURE 4 is of the form shown in FIGURES 2 and 3.

From the foregoing description of present preferred embodiments of this invention, it should thus be evident that there is provided an improved calibration system for analytical instruments. By the use of novel clutch mechanisms, a single balance motor is enabled to provide both an output signal and a calibration signal. The novel clutch mechanism of this invention is particularly useful wherever it is desired to provide a drive mechanism which disengages if the load exceeds a predetermined amount.

While the invention has been described in conjunction with present preferred embodiments, it should be evident that it is not limited thereto.

What is claimed is:

1. An analyzer comprising a fluid chamber, first means to position a first fluid to be measured in said chamber, second means to position a reference fluid in said chamber, timing means to position the two fluids in said chamber in sequence, third means to establish a signal representative of the composition of the fluid in said chamber, a motor, fourth means to energize said motor responsive to said signal, fifth means to indicate said signal, sixth means to adjust the amplitude of said signal, clutch means to connect the drive shaft of said motor selectively to said fifth and sixth means, and means to actuate said clutch means responsive to said timing means so that said motor is connected to said fifth means when said first fluid is in said chamber and to said sixth means when said reference fluid is in said chamber.

2. An analyzer comprising a fluid chamber, first means to position a first fluid to be measured in said chamber, second means to position a reference fluid in said chamber, timing means to position the two fluids in said chamber in sequence, a source of electromagnetic radiation, means to direct first and second beams of radiation from said source through said chamber, a filter disposed in one of said beams, first and second radiation detectors positioned to receive said first and second beams, respectively, a bridge network including said detectors to provide an electrical signal representative of the composition of the fluid in said chamber, a motor actuated by said signal, third means to indicate said signal, fourth means to adjust said bridge network, clutch means to connect the drive shaft of said motor selectively to said third and fourth means, and means to actuate said clutch means responsive to said timing means so that said motor is connected to said third means when said first fluid is in said chamber and to said fourth means when said reference fluid is in said chamber.

3. An analyzer comprising a fluid chamber, first means to position a first fluid to be measured in said chamber, second means to position a reference fluid in said chamber, timing means to position the two fluids in said chamber in sequence, a source of electromagnetic radiation, means to direct a beam of radiation from said source through said chamber, a detector disposed in said beam to measure the transmitted radiation, means to establish a first voltage representative of the transmitted radiation, means to establish a reference voltage, means to compare said voltages, a motor actuated by said means to compare, third means to indicate said first voltage, fourth means to adjust said reference voltage, clutch means to connect the drive shaft of said motor selectively to said third and fourth means, and means to actuate said clutch means responsive to said timing means so that said motor is connected to said third means when said first fluid is in said chamber and to said fourth means when said reference fluid is in said chamber.

UNITED STATES PATENTS

References Cited in the file of this patent

| | | |
|---|---|---|
| 1,989,984 | Hope | Feb. 5, 1935 |
| 2,499,322 | Mather et al. | Feb. 28, 1950 |
| 2,577,735 | Broomell | Dec. 11, 1951 |
| 2,579,825 | Hutchins | Dec. 25, 1951 |
| 2,698,679 | Vernhes | Jan. 4, 1955 |
| 2,792,501 | Barton | May 14, 1957 |
| 2,831,118 | Sparks et al. | Apr. 15, 1958 |
| 2,833,928 | Parsons | May 6, 1958 |
| 2,838,586 | Kratochvil | June 10, 1958 |